United States Patent
Yoshida et al.

(10) Patent No.: US 11,951,447 B1
(45) Date of Patent: Apr. 9, 2024

(54) SUBMERSIBLE AERATION APPARATUS

(71) Applicant: TSURUMI MANUFACTURING CO., LTD., Osaka (JP)

(72) Inventors: Hideto Yoshida, Kyoto (JP); Kousuke Nakanishi, Kyoto (JP)

(73) Assignee: Tsurumi Manufacturing Co., Ltd., Osaka (JP)

( * ) Notice: Subject to any disclaimer, the term of this patent is extended or adjusted under 35 U.S.C. 154(b) by 0 days.

(21) Appl. No.: 18/276,564

(22) PCT Filed: Feb. 18, 2022

(86) PCT No.: PCT/JP2022/006723
§ 371 (c)(1),
(2) Date: Aug. 9, 2023

(87) PCT Pub. No.: WO2022/224575
PCT Pub. Date: Oct. 27, 2022

(30) Foreign Application Priority Data

Apr. 20, 2021 (JP) ................. 2021-071063

(51) Int. Cl.
*B01F 3/04* (2006.01)
*B01F 23/232* (2022.01)
(Continued)

(52) U.S. Cl.
CPC .......... *B01F 23/23231* (2022.01); *B01F 23/237611* (2022.01); *B01F 25/60* (2022.01); *F04D 31/00* (2013.01); *B01F 2101/305* (2022.01)

(58) Field of Classification Search
CPC ........ B01F 23/23231; B01F 23/237611; B01F 25/60; B01F 2101/305; F04D 31/00
(Continued)

(56) References Cited

U.S. PATENT DOCUMENTS 8,297,599 B2 * 10/2012 Tanaka ............. B01F 23/23342
261/93
2010/0207285 A1 8/2010 Tanaka et al.
(Continued)

FOREIGN PATENT DOCUMENTS

JP S5611080 B2 3/1981
JP S614720 Y2 2/1986
(Continued)

OTHER PUBLICATIONS

Partial Translation of WO 2019/186926 A1 (Year: 2019).*

*Primary Examiner* — Charles S Bushey
(74) *Attorney, Agent, or Firm* — Millen, White, Zelano & Branigan P.C.; William F. Nixon

(57) ABSTRACT

A submersible aeration apparatus includes an air passage formed on a pump chamber to draw air into the pump chamber. A suction port formed on a lower side of the pump chamber draws liquid into the pump chamber. An impeller draws air through the air passage and liquid through the suction port. An ejection passage ejects the air and liquid. The impeller includes a main plate portion to cover a connection port connecting the air passage to the pump chamber. A vane portion protrudes downward from a lower surface of the main plate portion on the suction port side. The main plate portion has a cut-out part connecting the air passage and the pump chamber, and a groove part recessed from an upper surface of the main plate portion toward the lower surface and extending from an inner peripheral side toward an outer peripheral side of the main plate portion.

9 Claims, 5 Drawing Sheets

(51) Int. Cl.
  *B01F 23/237* (2022.01)
  *B01F 25/60* (2022.01)
  *F04D 31/00* (2006.01)
  *B01F 101/00* (2022.01)

(58) Field of Classification Search
  USPC .................................................... 261/91, 93
  See application file for complete search history.

(56) References Cited

U.S. PATENT DOCUMENTS

| | | |
|---|---|---|
| 2017/0051756 A1 | 2/2017 | Fang et al. |
| 2019/0093670 A1 | 3/2019 | Aggarwal |
| 2022/0072244 A1 | 3/2022 | Barlow et al. |

FOREIGN PATENT DOCUMENTS

| | | | |
|---|---|---|---|
| JP | H08323385 A | | 12/1996 |
| JP | H11148481 A | | 6/1999 |
| JP | 2004188259 A | | 7/2004 |
| JP | 2004188260 A | | 7/2004 |
| JP | 2004188261 A | | 7/2004 |
| JP | 2008180164 A | | 8/2008 |
| JP | 2009095756 A | | 5/2009 |
| JP | 2013029033 A | | 2/2013 |
| JP | 2017053347 A | | 3/2017 |
| JP | 2019037794 A | | 3/2019 |
| JP | 2020535349 A | | 12/2020 |
| WO | WO 2019/186926 A1 | * | 10/2019 |

* cited by examiner

ENLARGED PART A

| WATER DEPTH [m] | AIR FLOW RATE (Sm³/h) | | IMPROVE-MENT RATIO (%) |
|---|---|---|---|
| | IMPELLER OF COMP. EX. | IMPELLER OF EXAMPLE | |
| 1.5 | 8.8 | 10.9 | 23.7 |
| 2.0 | 8.6 | 10.6 | 24.3 |
| 2.5 | 8.2 | 8.9 | 8.2 |
| 3.0 | 6.6 | 7.6 | 15.4 |
| 3.5 | 4.8 | 6.5 | 34.9 |
| 4.0 | 3.8 | 5.4 | 41.4 |

SUBMERSIBLE AERATION APPARATUS

TECHNICAL FIELD

The present invention relates to a submersible aeration apparatus.

BACKGROUND ART

Conventionally, a submersible aeration apparatus is known. Such a submersible aeration apparatus is disclosed in Japanese Patent Publication No. JP S56-11080, for example.

The above Japanese Patent Publication No. JP S56-11080 discloses an aeration apparatus including an air-sucking impeller configured to suck air from the atmosphere, a pumping impeller configured to draw liquid, and an electric motor configured to drive the air-sucking and pumping impellers through one rotation shaft. The liquid and the air can be mixed inside the aeration apparatus and ejected into the outside liquid.

PRIOR ART

Patent Document

Patent Document 1: Japanese Patent Publication No. JP S56-11080

SUMMARY OF THE INVENTION

Problems to be Solved by the Invention

Although not disclosed in the above Japanese Patent Publication No. JP S56-11080, conventionally in the field of the submersible aeration apparatus, it is desired to improve an air-sucking rate (sucking pressure) by an impeller relative to its predetermined inflow liquid rate for more effective aeration. However, such improvement of an air-sucking rate (sucking pressure) by an impeller relative to its predetermined inflow liquid rate is not taken into consideration in the above Japanese Patent Publication No. JP S56-11080.

The present invention is intended to solve the above problems, and one object of the present invention is to provide a submersible aeration apparatus capable of improving an air-sucking rate (sucking pressure) relative to its predetermined inflow liquid rate.

Means for Solving the Problems

In order to attain the aforementioned object, a submersible aeration apparatus according to an aspect of the present invention includes an air passage formed on an upper side of a pump chamber to draw air into the pump chamber; a suction port formed on a lower side of the pump chamber to draw liquid into the pump chamber; an impeller arranged in the pump chamber and configured to rotate so as to draw air through the air passage and liquid through the suction port; and an ejection passage formed to eject the air and liquid drawn into the pump chamber to the outside, wherein the impeller includes a main plate portion arranged to overlap a connection port connecting the air passage to the pump chamber, and a vane portion protruding downward from a lower surface of the main plate portion on the suction port side; and the main plate portion has a cut-out part connecting the air passage and the pump chamber to each other, and a concave groove part recessed from an upper surface of the main plate portion toward the lower surface and extending from an inner peripheral side toward an outer peripheral side of the main plate portion.

In the submersible aeration apparatus according to the aspect of the present invention includes, as described above, the main plate portion of the impeller has the cut-out part, which connects the air passage and the pump chamber to each other, and a concave groove part, which is recessed from an upper surface of the main plate portion toward the lower surface and extends from an inner peripheral side toward an outer peripheral side of the main plate portion. Accordingly, in addition to air that flows into the pump chamber through a cut-out part, because a negative pressure can be produced by the groove part when the impeller rotates, the negative pressure can effectively flow air from the atmosphere into the air passage. That is, a shape of the impeller such as the groove part can improve its air-sucking rate (sucking pressure). Therefore, it is possible to improve (increase) an air-sucking rate (sucking pressure) relative to a predetermined inflow liquid rate flowing into the submersible aeration apparatus.

In the aforementioned submersible aeration apparatus according to this aspect, the impeller preferably includes a plurality of groove parts spaced at a predetermined interval away from each other in a circumferential direction of the impeller. According to this configuration in which a negative pressure can be produced by the plurality of groove parts at a plurality of points of the impeller, negative pressures produced at the plurality of points can effectively flow air from the atmosphere into the air passage. Therefore, it is possible to further improve an air-sucking rate (sucking pressure) relative to its predetermined inflow liquid rate flowing into the submersible aeration apparatus.

In the aforementioned submersible aeration apparatus according to this aspect, it is preferable that the cut-out part includes a plurality of cut-out parts, and the groove part includes a plurality of groove parts; and the plurality of cut-out parts and the plurality of groove parts are alternately arranged in a/the circumferential direction of the impeller. According to this configuration in which the cut-out parts and the groove parts are alternately arranged in the circumferential direction of the impeller, air flows into the pump chamber can be brought in balance in the circumferential direction of the impeller so that negative pressures can be produced in balance. Consequently, imbalance forces can be prevented from acting on the impeller in the circumferential direction of the impeller, that is, the impeller can effectively rotate.

In the aforementioned submersible aeration apparatus according to this aspect, it is preferable that a casing having the pump chamber formed inside the casing is further provided; an outer peripheral side end of the groove part extends to an outer peripheral side end surface of the main plate portion; and the impeller is configured to flow air into the pump chamber from the air passage through the cut-out part, and to flow air into the groove part and then into the pump chamber from the groove part through a gap between the casing and the outer peripheral side end surface of the main plate portion. According to this configuration, air can flow into the pump chamber through the gap between the casing and the outer peripheral side end surface of the main plate portion in addition to through the cut-out part. Therefore, it is possible to further improve an air-sucking rate (sucking pressure) relative to its predetermined inflow liquid rate flowing into the submersible aeration apparatus.

In this configuration, the outer peripheral side end of the groove part preferably has a beveled section. According to this configuration, an airflow path between the groove part and the gap can be tapered by the beveled section. Consequently, a sharp change in size of the airflow path can be prevented by the beveled section so that pressure loss of air can be reduced when the air flows into the gap from the groove part.

In the aforementioned submersible aeration apparatus according to this aspect, the groove part preferably has a depth not smaller than one-third and not greater than two-thirds a thickness of the main plate portion. According to this configuration, it is possible to prevent reduction of strength of the main plate portion caused by a groove part that has a depth greater than two-thirds the thickness of the main plate portion. In addition, it is possible to prevent an insufficient negative pressure caused by a groove part that has a depth smaller than one-third the thickness of the main plate portion when the groove part produces the negative pressure.

In the aforementioned submersible aeration apparatus according to this aspect, it is preferable that a rotation shaft supporting the impeller is further provided; the impeller further includes a boss portion arranged coaxially with the rotation shaft on an inner peripheral side of the main plate portions; and an inner peripheral side end of the groove part reaches the boss portion. According to this configuration in which the inner peripheral side end of the groove part reaches the boss portion, a large negative pressure can be produced by the groove part when the impeller rotates. Accordingly, air can more effectively flow from the atmosphere into the air passage. Therefore, it is possible to further improve an air-sucking rate (sucking pressure) relative to its predetermined inflow liquid rate flowing into the submersible aeration apparatus.

In the aforementioned submersible aeration apparatus according to this aspect, the groove part preferably has a width in a/the circumferential direction of the main plate portion greater than a depth of the groove part. According to this configuration, the groove part can have a relatively wide opening on its air suction side where air flows into the groove part, and as a result air can effectively flow into the groove part.

In the aforementioned configuration that includes the casing having the pump chamber formed inside the casing, it is preferable that the connection port is formed in a circular shape in an inner-peripheral-side end surface of the casing; the casing includes an annular disk portion arranged over the main plate portion so as to cover the main plate portion and facing an upper surface of the main plate portion; and outer and inner peripheral side sections of the groove part are arranged in positions overlapping the annular disk portion and the connection port, respectively, in a plan view. According to this configuration, air can flow into the groove part not from the entire upper part of the groove part but from a part immediately above the inner peripheral side of the main plate portion of the impeller, which is deviated from the annular disk portion. Consequently, an air flow can be produced from the inner peripheral side toward the outer outer peripheral side in the groove part, and as a result the air can effectively flow through the end on the outer peripheral side of the impeller (groove part) from the groove part into the pump chamber.

In the aforementioned submersible aeration apparatus according to this aspect, the groove part preferably has an arc shape curved in a plan view. According to this configuration in which the groove part is curved in an arc shape, the groove part can be longer than a case in which the groove part is formed in a linear shape, and as a result a negative pressure can be produced in a greater range. Therefore, it is possible to further improve an air-sucking rate (sucking pressure) relative to its predetermined inflow liquid rate flowing into the submersible aeration apparatus.

Effect of the Invention

According to the present invention, as described above, it is possible to improve an air-sucking rate (sucking pressure) relative to its predetermined inflow liquid rate flowing into the submersible aeration apparatus.

MODES FOR CARRYING OUT THE INVENTION

Figure 1:
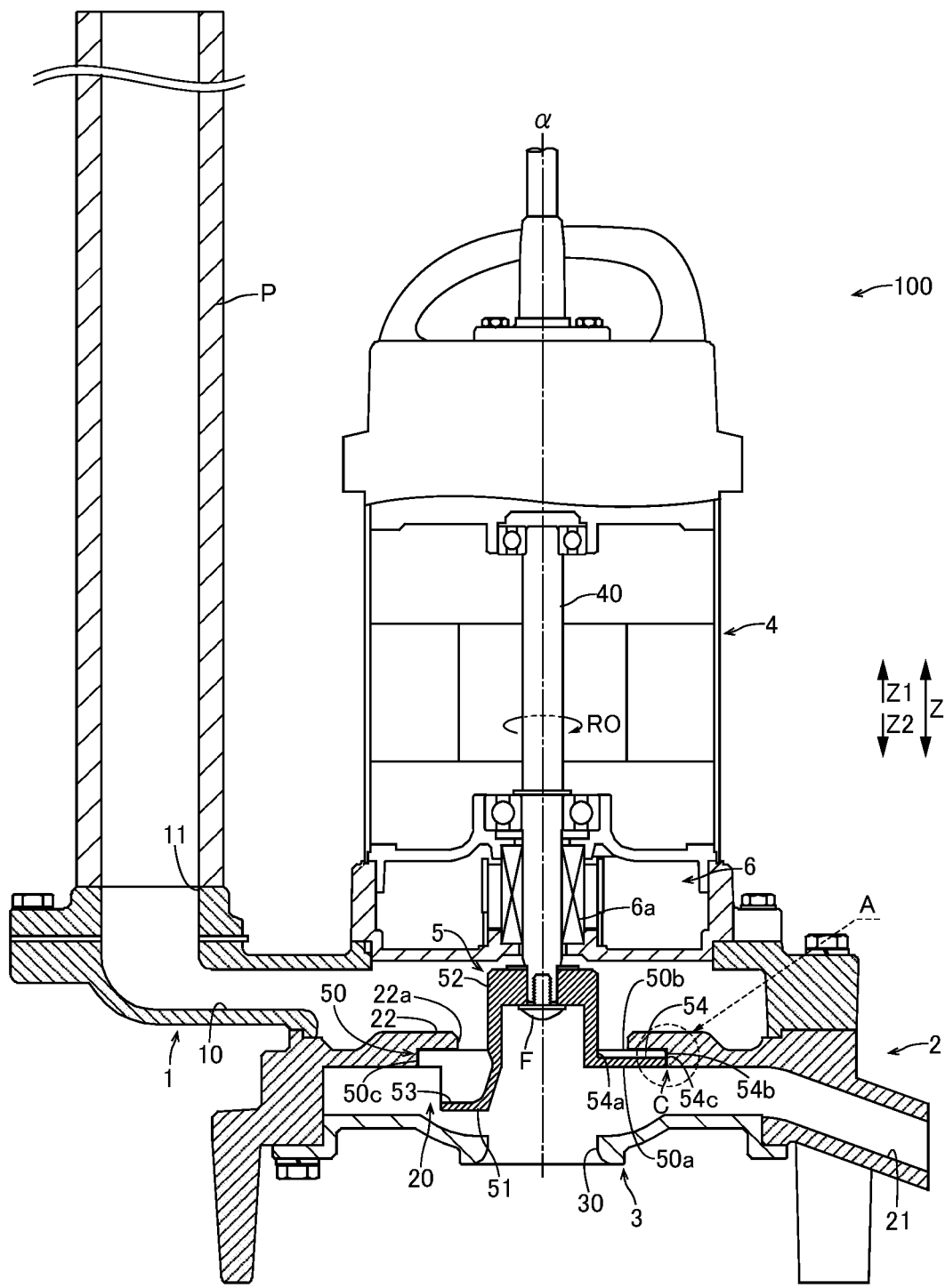
FIG. 1 is a sectional view showing the overall configuration of a submersible aeration apparatus according to an embodiment.

The following description will describe embodiments with reference to the drawings.
Embodiment
Configuration of Submersible Aeration Apparatus A submersible aeration apparatus 100 according to an embodiment is described with reference to FIGS. 1 to 5. Upward and downward directions are indicated by Z1 and Z2 directions, respectively, in the drawings. Also, a circumferential direction of an impeller 5 is indicated by an R direction.

The submersible aeration apparatus 100 can be placed on a bottom surface of a water-retaining area, such as aeration tank, as shown in FIG. 1, to aerate the contents of the water-retaining area. The submersible aeration apparatus 100 is placed in a relatively deep part of the water-retaining area and can aerate the contents in the deep part of the tank.

The submersible aeration apparatus 100 is configured to rotate the impeller 5 in a pump chamber (gas-liquid mixing chamber) 20 to produce a negative pressure in the pump chamber 20. The submersible aeration apparatus 100 is configured to correspondingly flow air from the atmosphere above the surface of liquid in the aeration tank and to flow the liquid the aeration tank into the submersible aeration apparatus. Also, the submersible aeration apparatus 100 is configured to mix the air and the liquid and then eject the mixed air and liquid (gas-liquid mixture) into the liquid in the aeration tank by rotating the impeller 5 in the pump chamber 20. The gas-liquid mixture ejected from the submersible aeration apparatus 100 will have dissolved oxygen greater than the liquid that flows into the submersible aeration apparatus 100.

The submersible aeration apparatus 100 includes an air-flowing chamber (housing) 1, a guide casing 2 and a suction cover 3. A pump chamber 20 is formed inside the guide casing 2 to accommodate the impeller 5. The guide casing 2 is an example of a "casing" in the claims.

In addition, the submersible aeration apparatus 100 includes an electric motor 4 including a rotation shaft (output shaft) 40, and the impeller 5.

Configuration of "Air-Flowing Chamber" of Submersible Aeration Apparatus

The air-flowing chamber (housing) 1 has an air passage (air chamber) 10 arranged on an upper side of the pump chamber 20 to flow air into the pump chamber 20. Also, the air-flowing chamber 1 has an inflow air port 11 formed on an upstream-side end of the air passage 10 to flow air into the submersible aeration apparatus 100. An inflow air pipe P is connected to an upper side of the inflow air port 11. The inflow air pipe P has one end, which is a downstream-side end connected to the inflow air port 11, and another end, which is an upstream-side end located in the atmosphere above the liquid surface in the aeration tank to be able to draw air into the pipe. A blower device (fan) configured to forcedly flow air into the inflow air pipe P may be installed on the upstream-side end as another end of the inflow air pipe P.

Configuration of "Guide Casing" of Submersible Aeration Apparatus

The guide casing 2 is directly attached to the air-flowing chamber (housing) 1 from the bottom side. The guide casing 2 has a plurality of ejection passages 21 radially extending from the central pump chamber (gas-liquid mixing chamber) 20 in a plan view. The ejection passages 21 serves to eject the mixed air and liquid (gas-liquid mixture), which includes air and the liquid flowing into the pump chamber 20 and mixed in the pump chamber 20, into the liquid in the aeration tank.

The guide casing 2 includes an annular disk portion 22 in an upper part (air-flowing chamber 1 side) of the guide casing 2. The annular disk portion 22 is arranged over the main plate portion 50 to cover the main plate portion 50 of the impeller 5, and faces the upper surface 50b of the main plate portion 50 from the top side. The annular disk portion 22 is spaced from the upper surface 50b of the main plate portion 50 at a very small gap whose width is defined in the top-to-bottom direction (see FIG. 5). An exemplary width of this gap can be 0.5 mm.

The guide casing 2 (annular disk portion 22) has a connection port 22a connecting the air passage (air chamber) 10 to the pump chamber 20. The connection port 22a is a hole formed in a circular shape on an inner peripheral side end surface side of the guide casing 2. The circular connection port 22a is arranged on the inner side relative to an arc-shaped outer edge of the impeller 5 in a plan view. Consequently, the connection port 22a is arranged immediately above the impeller 5. The center of the connection port 22a substantially agrees with a rotation center axis a of the rotation shaft 40.

Configuration of "Suction Cover" of Submersible Aeration Apparatus

The suction cover 3 is directly attached to the guide casing 2 from the bottom side. The suction cover 3 can be removed from the guide casing 2 in a case in which the impeller 5 is mounted to or dismounted from the rotation shaft 40. The pump chamber 20 is formed on an upper side of the suction cover 3. The suction cover 3 has a suction port 30 arranged on a lower side of the pump chamber 20 to draw liquid into the pump chamber 20. The suction port 30 is a hole formed in a circular shape on an inner peripheral side end surface side of the suction cover 3. The suction port 30 is arranged immediately under the impeller 5. The center of the suction port 30 substantially agrees with the rotation center axis a of the rotation shaft 40.

Configuration of "Electric Motor Including Rotation Shaft" of Submersible Aeration Apparatus The rotation shaft 40 rotatably supports the impeller 5. Specifically, the impeller 5 is mounted to a bottom end of the rotation shaft 40 by a fixing member F. For example, the fixing member F is a bolt. The fixing member F is arranged inside a boss portion 52 of the impeller 5. A rotating direction (RO direction) of the rotation shaft 40 is a clockwise direction (RO direction) in a plan view. The electric motor 4 includes a stator, and a rotor rotatably supporting the rotation shaft 40. The electric motor 4 is configured to drive the impeller 5 to be rotated through the rotation shaft 40 to which the impeller 5 is mounted.

An oil chamber 6 is formed between the electric motor 4 and the pump chamber 20 (air passage 10), and is provided with a mechanical seal 6a extending along the rotation shaft 40. The mechanical seal 6a serves to prevent (reduce) entry of liquid inside the pump chamber (air passage 10) into the electric motor 4 side.

Configuration of "Impeller" of Submersible Aeration Apparatus

Figure 2:
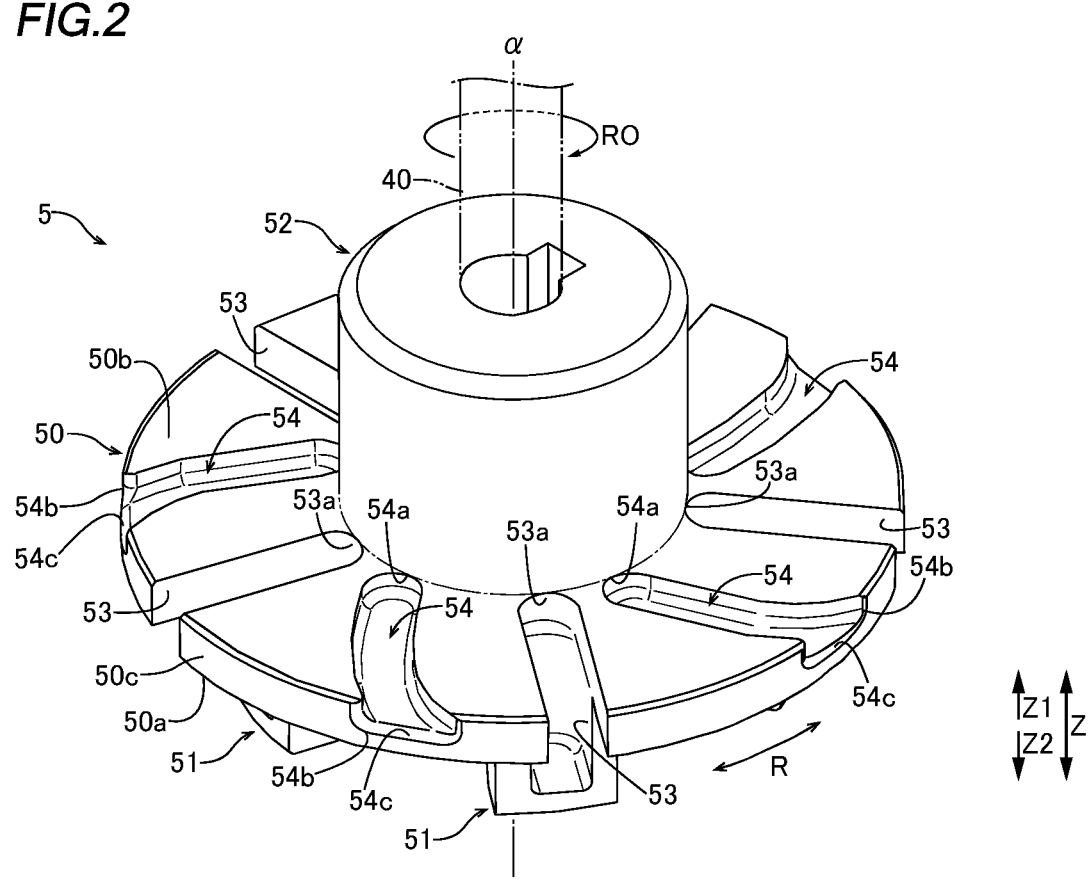
FIG. 2 is a perspective view showing an impeller of the submersible aeration apparatus according to the embodiment as viewed from the top side.
Figure 3:
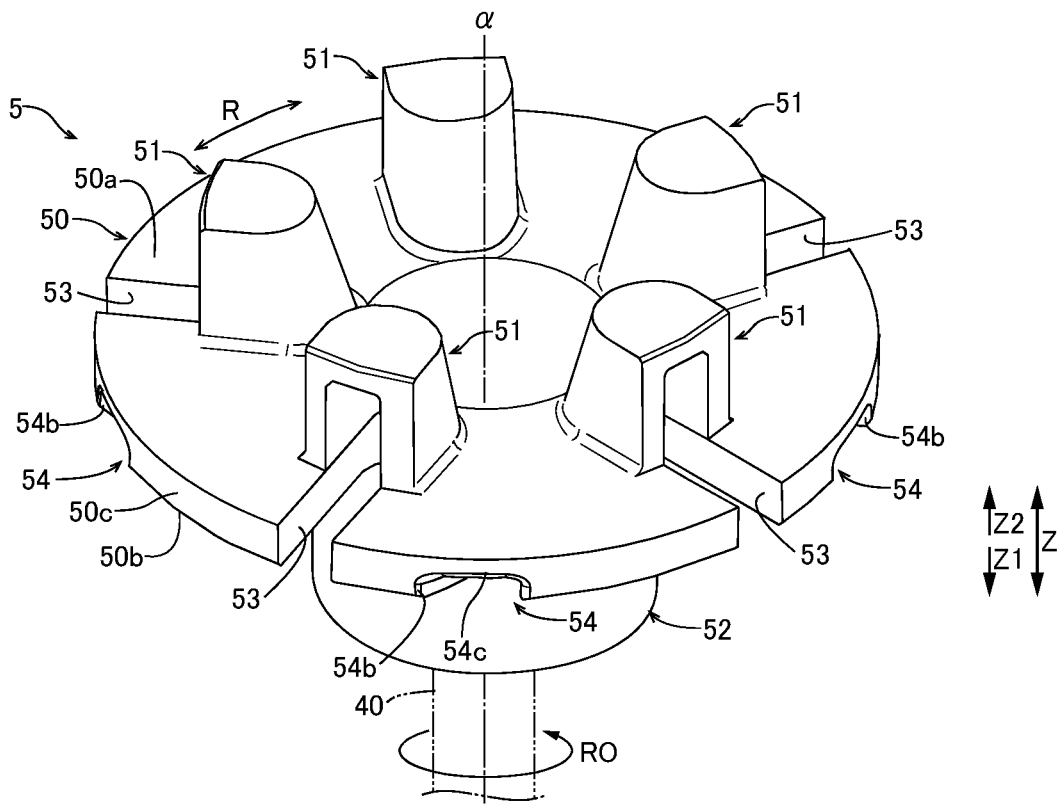
FIG. 3 is a perspective view showing the impeller of the submersible aeration apparatus according to the embodiment as viewed from the bottom side.
Figure 4:
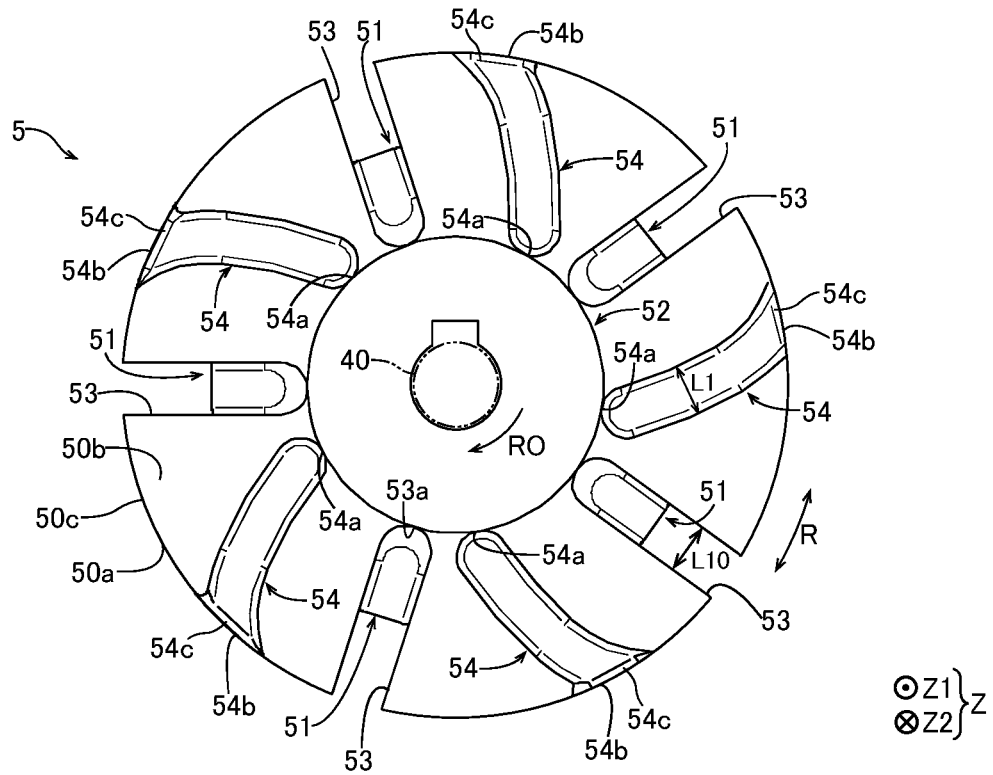
FIG. 4 is a plan view showing the impeller of the submersible aeration apparatus according to the embodiment.

The impeller 5 shown in FIGS. 2 to 4 serves to flow liquid and air into the submersible aeration apparatus 100. Also, the impeller 5 serves to mix the liquid and the air inside the submersible aeration apparatus 100. In other words, the impeller 5 serves to produce a gas-liquid mixture. In addition, the impeller 5 serves to eject the mixed liquid and air (gas-liquid mixture) to the liquid outside the submersible aeration apparatus 100.

The impeller 5 includes the main plate portion (shroud) 50 arranged to overlap the connection port 22a between the air passage 10 and the pump chamber 20, a plurality of (five) vane portions (vanes) 51 protruding downward from a lower surface 50a of the main plate portion 50 on its suction port 30 side, and the boss portion 52.

The main plate portion 50 has a disk shape extending in a horizontal direction and having a thickness in the top-to-bottom direction as thickness direction. The plurality of vane portions 51 are evenly spaced at a constant angle interval in the circumferential direction (R direction) of the impeller 5. Each vane portion 51 has a curved surface having a U-shape as viewed from the bottom side, and a flat surface arranged on the bottom end of the U-shaped curved surface.

The boss portion 52 protrudes upward from the upper surface 50b of the main plate portion 50. The boss portion 52 is arranged coaxially with the rotation shaft 40 in the inner peripheral side of the main plate portion 50. The boss portion 52 has a hollow cylindrical shape opened on its lower side. The fixing member F, which fixes the impeller 5 to the rotation shaft 40, is arranged inside the boss portion 52 as described above.

The main plate portion 50 has a plurality of (five) cut-out parts 53 and a plurality of (five) groove parts 54.

The plurality of cut-out parts 53 are evenly spaced at a constant angle interval in the circumferential direction of the impeller 5. The plurality of groove parts 54 are also evenly spaced at a constant angle interval in the circumferential direction of the impeller 5. The plurality of cut-out parts 53 and the plurality of groove parts 54 are alternately arranged in the circumferential direction of the impeller 5.

Configuration of "Cut-Out Part" of Main Plate Portion

The air passage 10 and the pump chamber 20 communicate with each other through the cut-out part 53. Each cut-out part 53 has a U shape obtained by cutting out the main plate portion 50 in the U shape in a plan view (as viewed from the bottom side). Each cut-out part 53 linearly extends in a radial direction of the vane portion 51. Each cut-out part 53 is partially located in the vane portion 51. Each cut-out part 53 communicates with the pump chamber 20 in an outer peripheral end surface of its corresponding vane portion 51. Each cut-out part 53 has an inner peripheral side end 53a reaching the boss portion 52. The inner peripheral side end 53a of each cut-out part 53 is formed in a semicircular shape in a plan view.

Configuration of "Groove Part" of Main Plate Portion

The groove part 54 is recessed from the upper surface 50b of the main plate portion 50 toward the lower surface 50a of the main plate portion 50 in a concave shape. The groove part 54 extends from the inner peripheral side to the outer peripheral side of the main plate portion 50.

Each groove part 54 has an inner peripheral side end 54a reaching the boss portion 52. The inner peripheral side end 54a of each groove part 54 is formed in a semicircular shape in a plan view. Each groove part 54 has an outer peripheral side end 54b reaching an outer peripheral side end surface 50c of the main plate portion 50. The outer peripheral side end 54b of each groove part 54 has a beveled section 54c. The beveled section 54c is a so-called chamfer. Note that the beveled section may be other unsharp edge such as rounded section.

The groove part 54 has an arc shape curved in a plan view. Specifically, each groove part 54 is curved so that a part of the groove part 54 between the inner peripheral side end 54a and the outer peripheral side end 54b is located on the rotating direction (RO direction) side of the rotation shaft 40 relative to the inner peripheral side end 54a and the outer peripheral side end 54b of the groove part 54 in a plan view.

The groove part 54 shown in FIG. 4 has a substantially constant width L1 in the circumferential direction (R direction) of the impeller 5, which is merely one example. Also, the width L1 of the groove part 54 in the circumferential direction of the impeller 5 is greater than a depth L2 (see FIG. 5) of the groove part 54 (L1>L2). More specifically, the width L1 of the groove part 54 in the circumferential direction of the impeller 5, which is merely one example, is substantially the same as a width L10 of the cut-out part 53 (L1≈L10).

Figure 5:
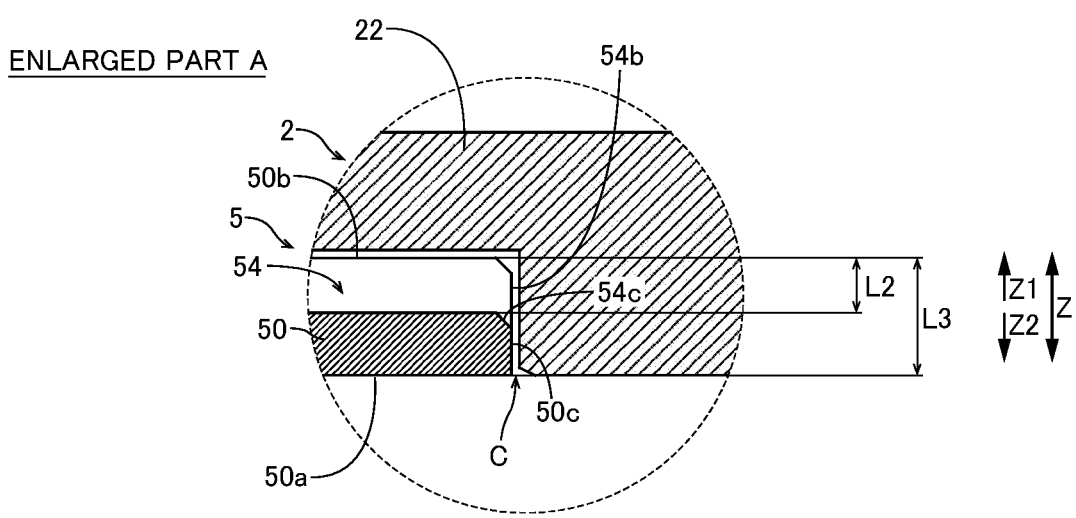
FIG. 5 is an partially enlarged view showing a part A in FIG. 1.

In addition, the groove part 54 shown in FIG. 5 has a depth L2, which is merely one example, is not smaller than one-third and not greater than two-thirds a thickness L3 of the main plate portion 50 (L3×⅓≤L2≤L3×⅔).

The outer and inner peripheral side sections of the groove part 54 are arranged in positions overlapping the annular disk portion 22 of the guide casing 2 and the connection port 22a, respectively, in a plan view. That is, the submersible aeration apparatus 100 is configured to flow air into the pump chamber 20 from a position immediately above the impeller 5 on the inner peripheral side of the impeller 5.

When the impeller 5 rotates, two paths through which air flows from the air passage 10 into the pump chamber 20 will be formed. Specifically, the impeller 5 is configured to flow air into the pump chamber 20 from the air passage 10 through each cut-out part 53 and to flow air from the air passage 10 into each groove part 54 and then into the pump chamber 20 from the groove part 54 through a gap C (see FIG. 5) between the casing 2 and the outer peripheral side end surface 50c of the main plate portion 50.

Specifically, in the inflow of air through the gap C, rotation of the impeller 5 produces a negative pressure in each groove part 54 whereby flowing air from the air passage 10 into the groove part 54. The air flowing into the groove part 54 then flows into the pump chamber 20 through the gap C. An exemplary width of this gap C can be 0.5 mm.

According to the submersible aeration apparatus 100 in which air can flow from the air passage 10 through the cut-out parts 53 and the gaps C into the pump chamber 20, the submersible aeration apparatus 100 can have a larger air flow rate relative to its flow liquid rate than a case in which an impeller without groove parts is configured to flow air only through cut-out parts into the pump chamber. Consequently, the submersible aeration apparatus 100 can effectively draw air. Therefore, the submersible aeration apparatus 100 can effectively increase dissolved oxygen in air and liquid (gas-liquid mixture) to be ejected into liquid in the aeration tank.

Advantages of the Embodiment

In this embodiment, the following advantages are obtained.

In this embodiment, as described above, the main plate portion 50 of the impeller 5 has a cut-out part 53 connecting the air passage 10 and the pump chamber 20 to each other, and a concave groove part 54 recessed from an upper surface 50b toward a lower surface 50a of the main plate portion 50 and extending from an inner peripheral side toward an outer peripheral side of the main plate portion 50. Accordingly, in addition to air that flows into the pump chamber 20 through the cut-out parts 53, because a negative pressure can be produced by the groove parts 54 when the impeller 5 rotates, the negative pressure can effectively flow air from the atmosphere into the air passage 10. That is, a shape of the impeller 5 such as the groove part 54 can improve its air-sucking rate (sucking pressure). Therefore, it is possible to improve (increase) an air-sucking rate (sucking pressure) relative to a predetermined inflow liquid rate flowing into the submersible aeration apparatus 100.

In this embodiment, as described above, the impeller 5 includes a plurality of groove parts 54 spaced at a predetermined interval away from each other in a circumferential direction of the impeller 5. According to this configuration in which a negative pressure can be produced by the plurality of groove parts 54 at a plurality of points of the impeller 5, negative pressures produced at the plurality of points can effectively flow air from the atmosphere into the air passage 10. Therefore, it is possible to further improve an air-sucking rate (sucking pressure) relative to its predetermined inflow liquid rate flowing into the submersible aeration apparatus 100.

In this embodiment, as described above, the cut-out part includes a plurality of cut-out parts 53, and the groove part includes a plurality of groove parts 54; and the plurality of cut-out parts 53 and the plurality of groove parts 54 are alternately arranged in the circumferential direction of the impeller 5. According to this configuration in which the cut-out parts 53 and the groove parts 54 are alternately arranged in the circumferential direction of the impeller 5, air flows into the pump chamber 20 can be brought in balance in the circumferential direction of the impeller 5 so that negative pressures can be produced in balance. Consequently, imbalance forces can be prevented from acting on the impeller 5 in the circumferential direction of the impeller 5, that is, the impeller 5 can effectively rotate.

In this embodiment, as described above, a casing 2 having the pump chamber 20 formed inside the casing is further provided; an outer peripheral side end 54b of the groove part 54 extends to an outer peripheral side end surface 50c of the main plate portion 50; and the impeller is configured to flow air into the pump chamber 20 from the air passage 10 through the cut-out part 53, and to flow air into the groove part 54 and then into the pump chamber 20 from the groove part 54 through a gap C between the casing 2 and the outer peripheral side end surface 50c of the main plate portion 50. Accordingly, air can flow into the pump chamber 20 through the gap C between the casing 2 and the outer peripheral side end surface 50c of the main plate portion 50 in addition to through the cut-out part 53. Consequently, it is possible to further improve an air-sucking rate (sucking pressure) relative to its predetermined inflow liquid rate flowing into the submersible aeration apparatus 100.

In this embodiment, as described above, the outer peripheral side end 54b of the groove part 54 has a beveled section 54c. Accordingly, an airflow path between the groove part 54 and the gap C can be tapered by the beveled section 54c. Consequently, a sharp change in size of the airflow path can be prevented by the beveled section 54c so that pressure loss of air can be reduced when the air flows into the gap C from the groove part 54.

In this embodiment, as described above, the groove part 54 has a depth L2 not smaller than one-third and not greater than two-thirds the thickness L3 of the main plate portion 50. According to this configuration, it is possible to prevent reduction of strength of the main plate portion 50 caused by a groove part 54 that has a depth L2 greater than two-thirds the thickness L3 of the main plate portion 50. In addition, it is possible to prevent an insufficient negative pressure caused by a groove part 54 that has a depth L2 smaller than one-third the thickness L3 of the main plate portion 50 when the groove part 54 produces the negative pressure.

In this embodiment, as described above, a rotation shaft 40 supporting the impeller 5 is further provided; the impeller 5 further includes a boss portion 52 arranged coaxially with the rotation shaft 40 on an inner peripheral side of the main plate portion 50; and an inner peripheral side end 54a of the groove part 54 reaches the boss portion 52. According to this configuration in which the inner peripheral side end 54a of the groove part 54 reaches the boss portion 52, a large negative pressure can be produced by the groove part 54 when the impeller 5 rotates. Accordingly, air can more effectively flow from the atmosphere into the air passage 10. Consequently, it is possible to further improve an air-sucking rate (sucking pressure) relative to its predetermined inflow liquid rate flowing into the submersible aeration apparatus 100.

In this embodiment, as described above, the groove part 54 has a width L1 in the circumferential direction of the main plate portion 50 greater than a depth L2 of the groove part 54. Accordingly, the groove part 54 can have a relatively wide opening on its air suction side where air flows into the groove part 54, and as a result air can effectively flow into the groove part 54.

In this embodiment, as described above, the connection port 22a is formed in a circular shape in an inner-peripheral-side end surface of the casing 2; the casing 2 includes an annular disk portion 22 arranged over the main plate portion 50 so as to cover the main plate portion 50 and facing an upper surface 50b of the main plate portion 50; and outer and inner peripheral side sections of the groove part 54 are arranged in positions overlapping the annular disk portion 22 and the connection port 22a, respectively, in a plan view.

Accordingly, air can flow into the groove part 54 not from the entire upper part of the groove part 54 but from a part immediately above the inner peripheral side of the main plate portion 50 of the impeller 5, which is deviated from the annular disk portion 22. Consequently, an air flow can be produced from the inner peripheral side toward the outer outer peripheral side in the groove part 54, and as a result the air can effectively flow through the end on the outer peripheral side of the impeller 5 (groove part 54) from the groove part 54 into the pump chamber 20.

In this embodiment, as described above, the groove part 54 has an arc shape curved in a plan view. According to this configuration in which the groove part 54 is curved in an arc shape, the groove part 54 can be longer than a case in which the groove part is formed in a linear shape, and as a result a negative pressure can be produced in a greater range. Consequently, it is possible to further improve an air-sucking rate (sucking pressure) relative to its predetermined inflow liquid rate flowing into the submersible aeration apparatus 100.

EXAMPLE

An example is described with reference to FIGS. 6 and 7.

A submersible aeration apparatus according to an example that has been described in the embodiment was placed at a water depth ranging from 1.5 to 4.0 [m], and its flow rate [$Sm^3/h$] (air-sucking rate) of air flowing from an inlet of an air-flowing pipe located in the atmosphere was measured. The output and driven frequency of the electric motor is operated were 0.75 [kW] and 60 [Hz], respectively, as driving conditions under which the submersible aeration apparatuses according to the example. As described above, the impeller of the submersible aeration apparatus according to the example includes the groove parts and the cut-out parts.

Also, a submersible aeration apparatus according to a comparative example that included an impeller having a different shape from the example was placed at a water depth ranging from 1.5 to 4.0 [m], and its flow rate of air flowing from the inlet of the air-flowing pipe located in the atmosphere was measured. The driving conditions in the submersible aeration apparatus according to the comparative example were the same as the example. The submersible aeration apparatus according to the comparative example included the same configuration as the submersible aeration apparatus of the example except the impeller.

The impeller of the submersible aeration apparatus according to the comparative example has no groove part. Except that the impeller of the submersible aeration apparatus according to the comparative example has no groove part, it has the same shape as the impeller of the submersible aeration apparatus according to the example.

Result of Measurement

Figures 6, 7:
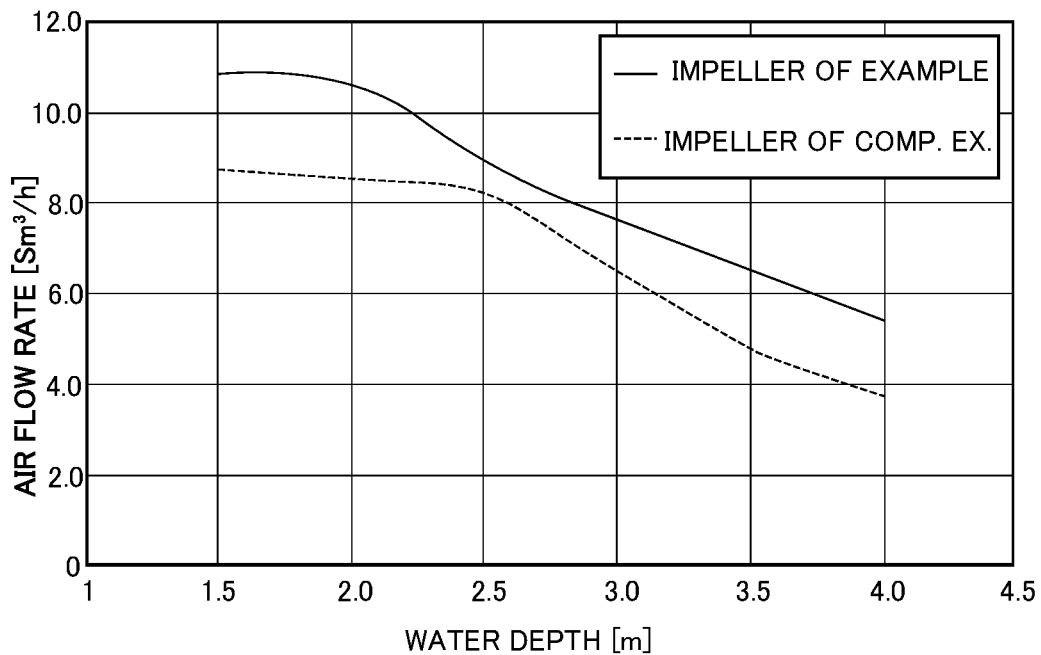
FIG. 6 is a graph showing relation between depth and air flow rate in an example and a comparative example.
FIG. 7 is a table showing relation between depth and air flow rate in the example and the comparative example.

As seen from FIGS. 6 and 7, the air flow rate in the example was greater than the comparative example at all of the placement water depths. Specifically, at a placement water depth 1.5 [m], the air flow rate in the example was 10.9 [$Sm^3/h$], and the air flow rate in the comparative example was 8.8 [$Sm^3/h$]. At a placement water depth 2.0 [m], the air flow rate in the example was 10.6 [$Sm^3/h$], and the air flow rate in the comparative example was 8.6 [$Sm^3/h$]. At a placement water depth 2.5 [m], the air flow rate in the example was 8.9 [$Sm^3/h$], and the air flow rate in the comparative example was 8.2 [$Sm^3/h$]. At a placement water depth 3.0 [m], the air flow rate in the example was 7.6 [$Sm^3/h$], and the air flow rate in the comparative example was 6.6 [Sm³/h]. At a placement water depth 3.5 [m], the air flow rate in the example was 6.5 [Sm³/h], and the air flow rate in the comparative example was 4.8 [Sm³/h]. At a placement water depth 4.0 [m], the air flow rate in the example was 5.4 [Sm³/h], and the air flow rate in the comparative example was 3.8 [Sm³/h].

According to the result of measurement in the example and the comparative example, it is confirmed that the groove parts, which were formed in the impeller in addition to the cut-out parts, increased the rate of flowing air. Although the air flow rate decreases with increase of the placement water depth both in the example and the comparative example, it is confirmed that air flowed at a higher rate in the example than in the comparative example in a deeper placement water depth range. In addition, a tendency is confirmed that the improvement ratio [%] of air flow rate in the example to the comparative example increases with increase of placement water depth in a range deeper than 2.5 [m].

Modified Embodiment

Note that the embodiment disclosed this time must be considered as illustrative in all points and not restrictive. The scope of the present invention is not shown by the above description of the embodiments but by the scope of claims for patent, and all modifications (modified embodiments) within the meaning and scope equivalent to the scope of claims for patent are further included.

Figure 8:
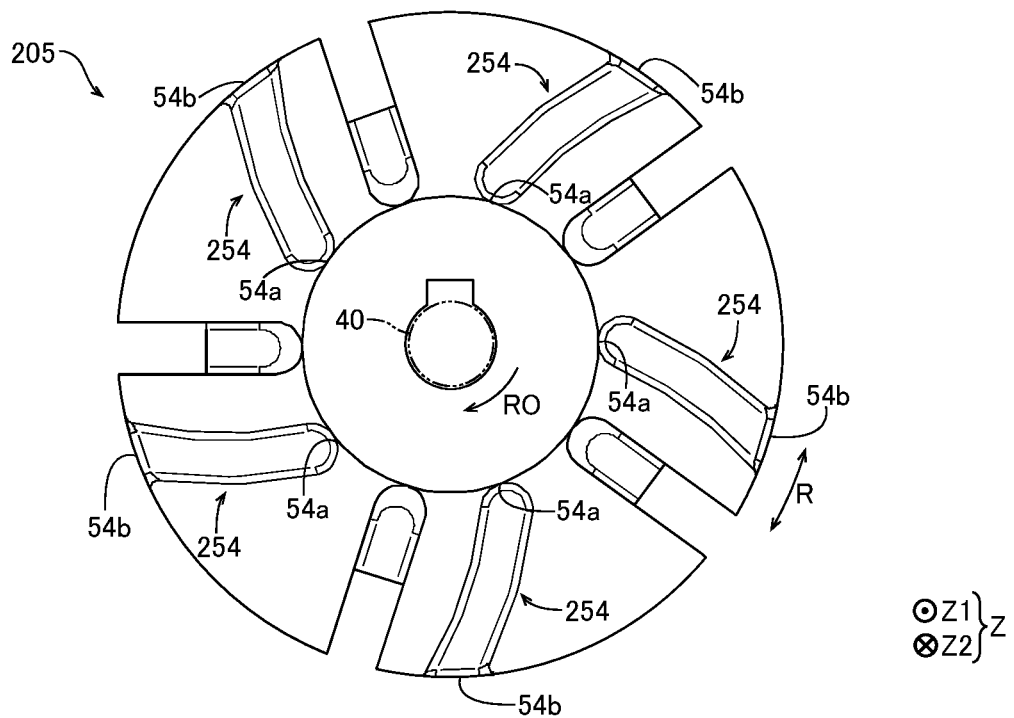
FIG. 8 is a plan view of showing an impeller according to a first modified example.

While the example in which each groove part is curved so that a part of the groove part between the inner peripheral side end and the outer peripheral side end is located on the rotating direction (RO direction) side of the rotation shaft relative to the inner peripheral side end and the outer peripheral side end of the groove part in a plan view has been shown in the aforementioned embodiment, the present invention is not limited to this. In the present invention, for example, as in an impeller 205 shown in FIG. 8, each groove part 254 is curved so that a part of the groove part 254 between the inner peripheral side end 54a and the outer peripheral side end 54b is located on the opposite direction to the rotating direction (RO direction) side of the rotation shaft 40 relative to the inner peripheral side end 54a and the outer peripheral side end 54b of the groove part 254 in a plan view. In other words, the groove part 254 may be curved inversely of the aforementioned embodiment.

Figure 9:
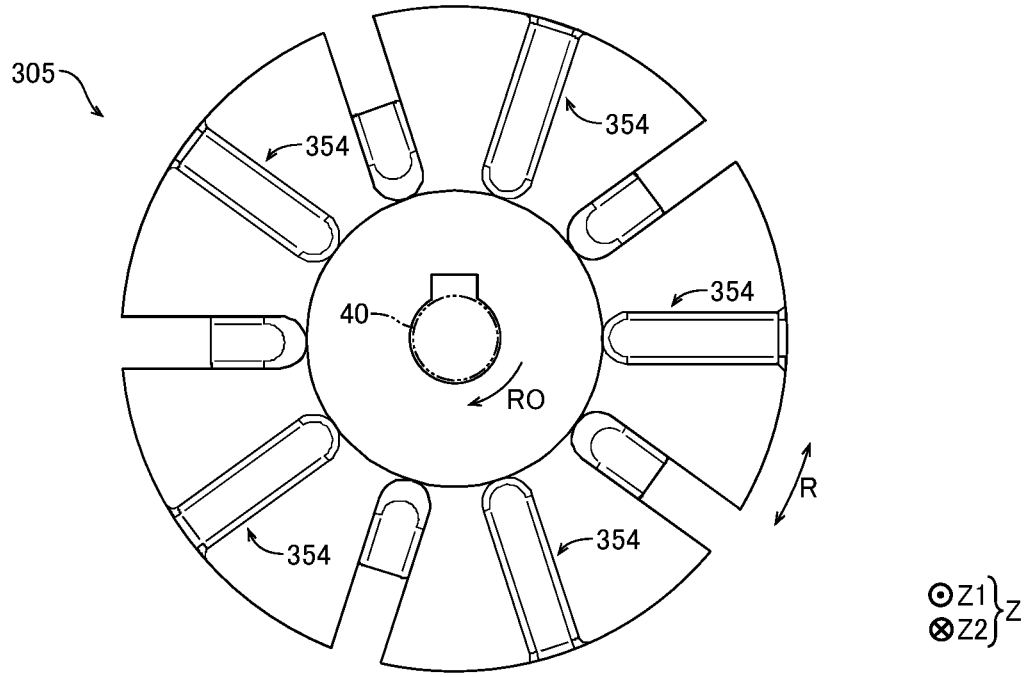
FIG. 9 is a plan view of showing an impeller according to a second modified example.

Also, as in the impeller 305 shown in FIG. 9, each groove part 354 may be formed to linearly extend in the radial direction of the impeller 305. Although not illustrated, the groove part may be formed to linearly extend in a slanting direction with respect to the radial direction of the impeller.

Also, while the example in which the five groove parts and the five cut-out parts are provided has been shown in the aforementioned embodiment, the present invention is not limited to this. In the present invention, any number (different from five) of groove parts or cut-out parts may be provided.

Also, the width of each groove part is not limited to the dimension described in the aforementioned embodiment, but the width of the groove part may be set to a different width from the aforementioned embodiment.

Also, the depth of each groove part is not limited to the dimension described in the aforementioned embodiment, but the depth of the groove part may be set to a different depth from the aforementioned embodiment.

While the example in which the plurality of cut-out parts and the plurality of groove parts are alternately arranged has been shown in the aforementioned embodiment, the present invention is not limited to this. In the present invention, the cut-out parts and the groove parts may not be alternately arranged.

While the example in which each cut-out part extends into the vane portion has been shown in the aforementioned embodiment, the present invention is not limited to this. In the present invention, the vane portion and the cut-out part may be separately arranged.

DESCRIPTION OF REFERENCE NUMERALS

2: guide casings (casing)
5, 205, 305: impeller
10: air passage
20: pump chambers
21: ejection passage
22: annular disk portions
22a: connection port
30: suction port
40: rotation shaft
50: main plate portion
50a: lower surface (of main plate portion)
50b: upper surface (of main plate portion)
50c: outer peripheral side end surface (of main plate portion)
51: vane portion
52: boss portion
53: cut-out part
54, 254, 354: groove part
54a: inner peripheral side end (of groove part)
54b: outer peripheral side end (of groove part)
54c: beveled section
100: submersible aeration apparatus
C: gap
L1: width of groove part
L2: depth of groove part
L3: thickness of main plate portion

The invention claimed is:

1. A submersible aeration apparatus comprising:
an air passage formed on an upper side of a pump chamber to draw air into the pump chamber;
a suction port formed on a lower side of the pump chamber to draw liquid into the pump chamber;
an impeller arranged in the pump chamber and configured to rotate so as to draw air through the air passage and liquid through the suction port;
an ejection passage formed to eject the air and liquid drawn into the pump chamber to the outside; and a casing having the pump chamber formed inside the casing,
wherein
the impeller includes a main plate portion arranged to overlap a connection port connecting the air passage to the pump chamber, and a vane portion protruding downward from a lower surface of the main plate portion on the suction port side;
the main plate portion has a cut-out part connecting the air passage and the pump chamber to each other, and a concave groove part recessed from an upper surface of the main plate portion toward the lower surface and extending from an inner peripheral side toward an outer peripheral side of the main plate portion;
an outer peripheral side end of the groove part extends to an outer peripheral side end surface of the main plate portion; and
the impeller is configured to flow air into the pump chamber from the air passage through the cut-out part, and to flow air into the groove part and then into the pump chamber from the groove part through a gap between the casing and the outer peripheral side end surface of the main plate portion.

2. The submersible aeration apparatus according to claim 1, wherein the impeller includes a plurality of groove parts spaced at a predetermined interval away from each other in a circumferential direction of the impeller.

3. The submersible aeration apparatus according to claim 1, wherein
the cut-out part includes a plurality of cut-out parts, and the groove part includes a plurality of groove parts; and
the plurality of cut-out parts and the plurality of groove parts are alternately arranged in a circumferential direction of the impeller.

4. The submersible aeration apparatus according to claim 1, wherein the outer peripheral side end of the groove part has a beveled section.

5. The submersible aeration apparatus according to claim 1, wherein the groove part has a depth not smaller than one-third and not greater than two-thirds a thickness of the main plate portion.

6. The submersible aeration apparatus according to claim 1 further comprising
a rotation shaft supporting the impeller, wherein
the impeller further includes a boss portion arranged coaxially with the rotation shaft on an inner peripheral side of the main plate portion; and
an inner peripheral side end of the groove part reaches the boss portion.

7. The submersible aeration apparatus according to claim 1, wherein the groove part has a width in a circumferential direction of the main plate portion greater than a depth of the groove part.

8. The submersible aeration apparatus according to claim 1, wherein
the connection port is formed in a circular shape in an inner-peripheral-side end surface of the casing;
the casing includes an annular disk portion arranged over the main plate portion so as to cover the main plate portion and facing an upper surface of the main plate portion; and
outer and inner peripheral side sections of the groove part are arranged in positions overlapping the annular disk portion and the connection port, respectively, in a plan view.

9. The submersible aeration apparatus according to claim 1, wherein the groove part has an arc shape curved in a plan view.

* * * * *